United States Patent [19]
Butler

[11] Patent Number: 4,852,433
[45] Date of Patent: Aug. 1, 1989

[54] INTERLOCKING BLADE PAIR FOR STRIPPING INSULATED ELECTRICAL CONDUCTORS

[75] Inventor: John D. Butler, New Berlin, Wis.

[73] Assignee: Mechtrix Corporation, Menomonee Falls, Wis.

[21] Appl. No.: 51,722

[22] Filed: May 18, 1987

[51] Int. Cl.⁴ .............................................. H02G 1/12
[52] U.S. Cl. ....................................... 81/9.51; 30/346; 30/90.1
[58] Field of Search ................ 81/9.4, 9.51, 9.41, 81/91.42, 9.43, 9.44; 30/90.1, 346, 241; 83/693

[56] References Cited
U.S. PATENT DOCUMENTS

| | | | |
|---|---|---|---|
| 2,645,959 | 7/1953 | Fuchs et al. | 81/9.51 X |
| 2,871,740 | 2/1959 | Andren | 81/9.51 |
| 3,019,679 | 2/1962 | Schwalm et al. | 81/9.51 |
| 3,527,124 | 9/1970 | Ullman | 81/9.51 |

Primary Examiner—Debra Meislin
Attorney, Agent, or Firm—Fuller, Puerner & Hohenfeldt

[57] ABSTRACT

Insulation is precisely cut and stripped from insulated electrical conductors by V type stripping blades. Precision cutting and stripping is assured by forming the blades with complementary and interlocking T and U-shaped cross sections. The blades have increased stiffness compared with prior blades even though the overall thickness of the blade pair does not exceed the overall thickness of prior blade pairs. A blade stop is interlockable with either stripping blade to precisely control the cutting hole size during production. An insulation stop is also interlockable with a selected blade for precisely locating the insulated electrical conductor relative to the blade cutting edges when the blades are closed over the conductor.

22 Claims, 3 Drawing Sheets

U.S. Patent   Aug. 1, 1989   Sheet 1 of 3   4,852,433
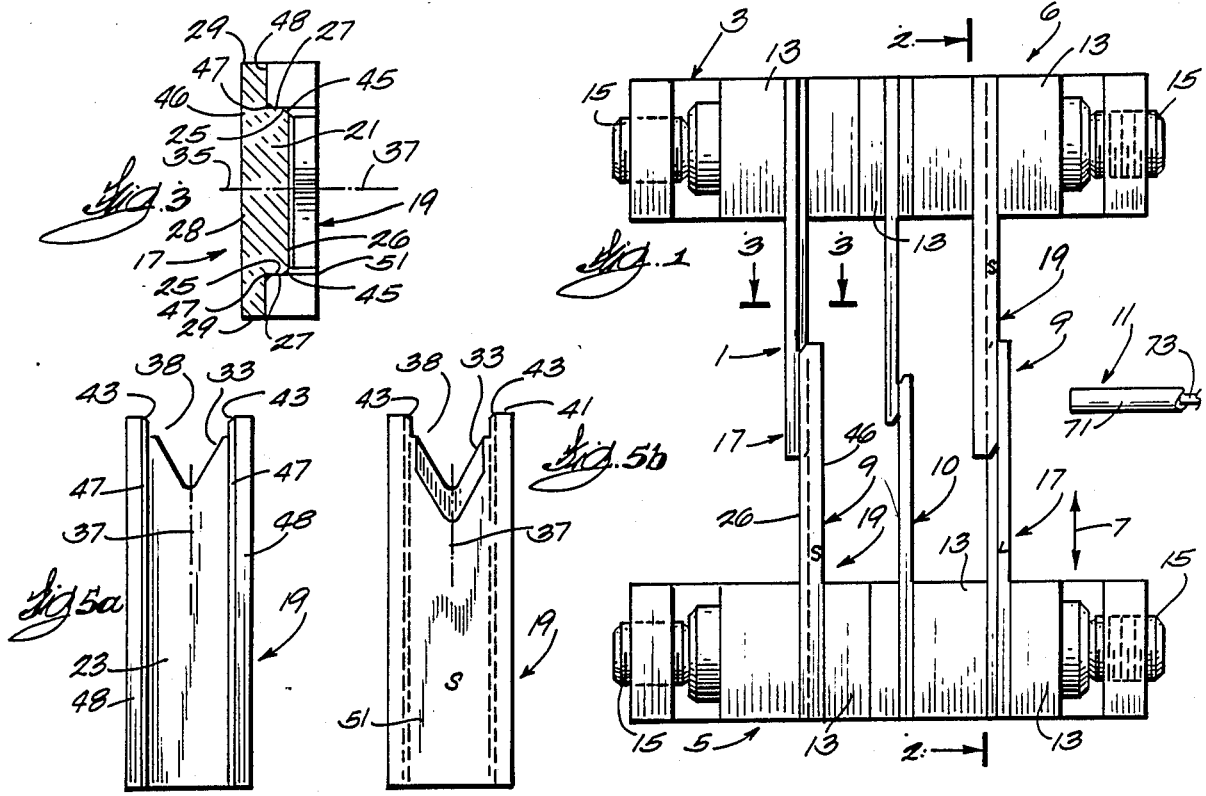
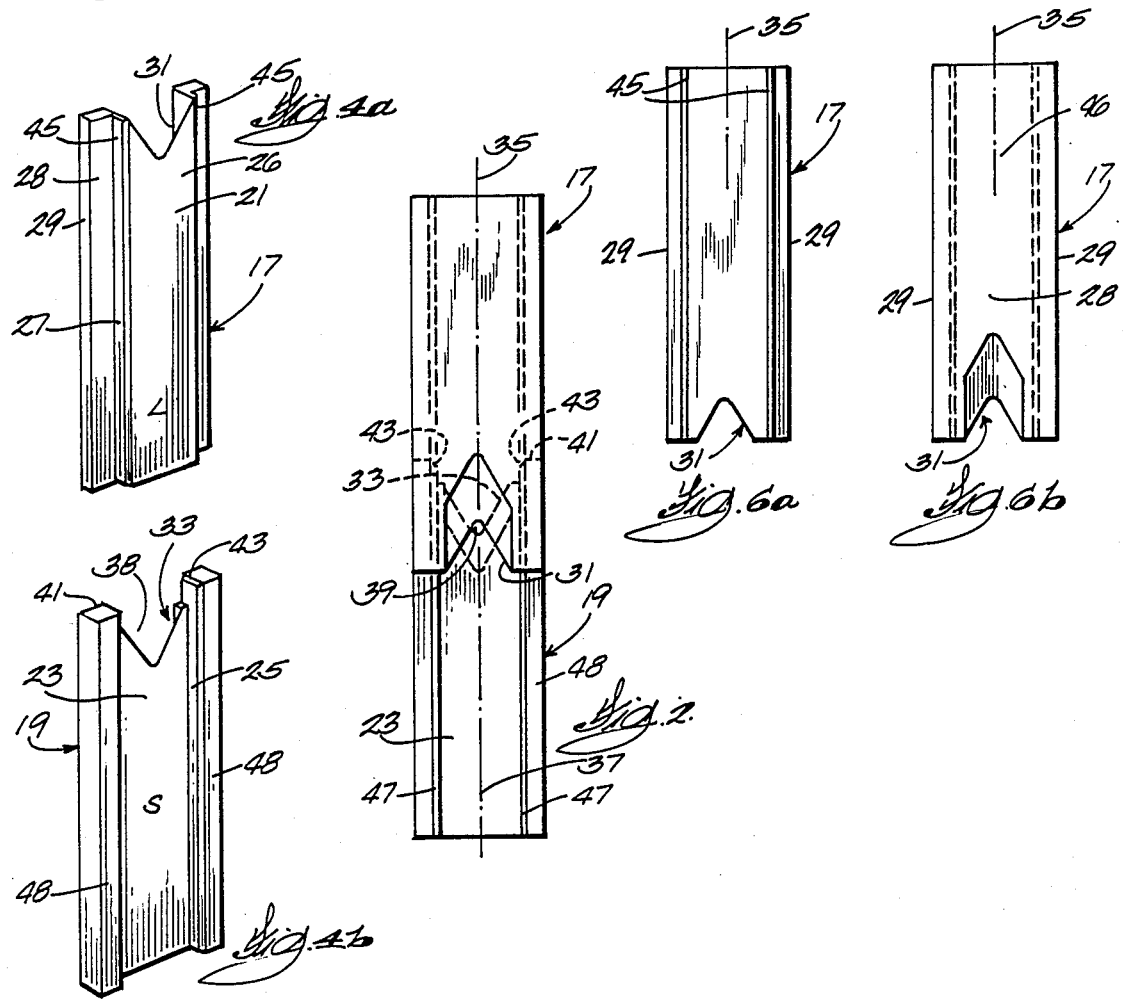

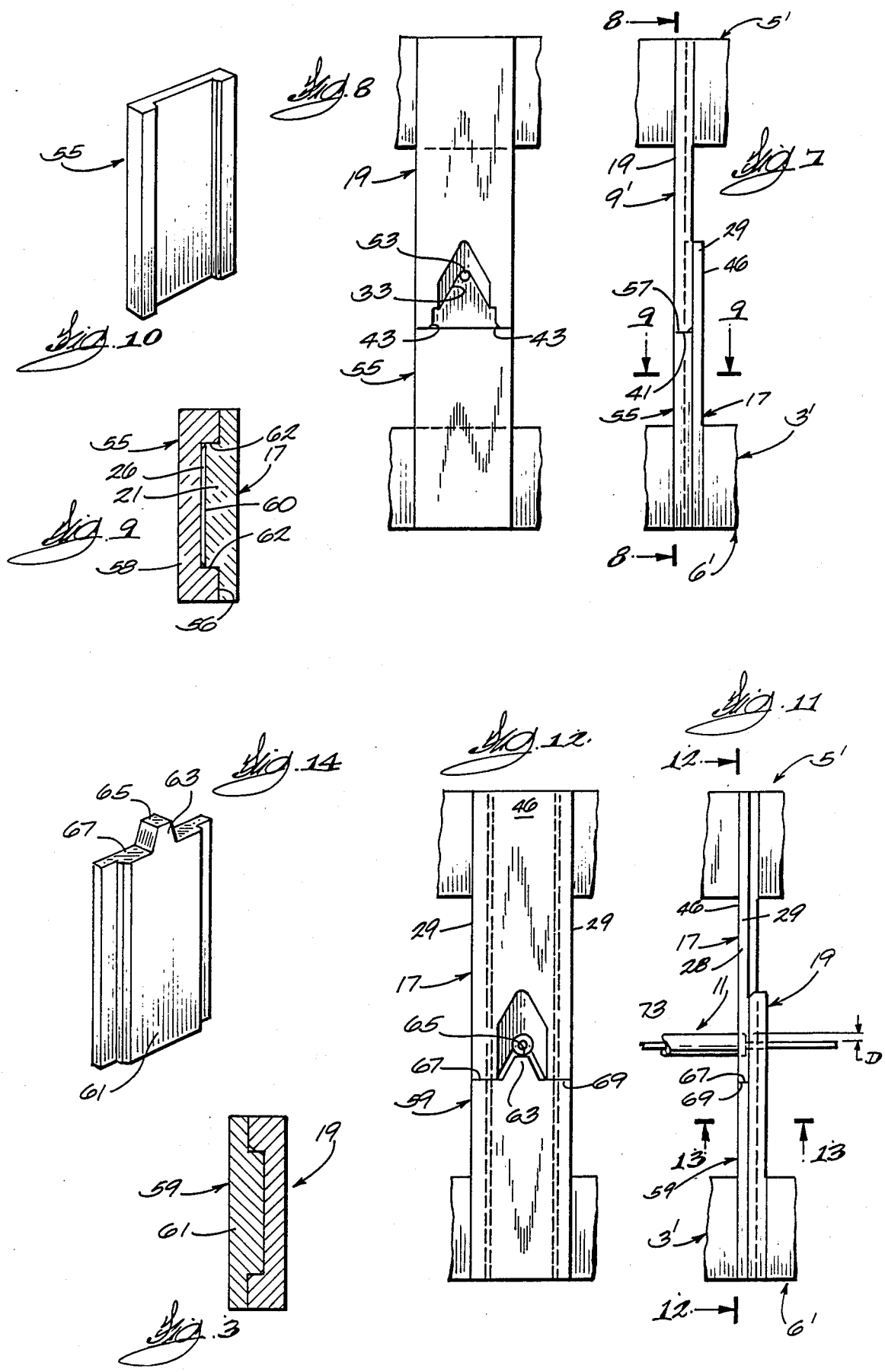

INTERLOCKING BLADE PAIR FOR STRIPPING INSULATED ELECTRICAL CONDUCTORS

BACKGROUND OF THE INVENTION

1. Field of the Invention

This invention pertains to cutting devices, and more particularly to apparatus for precisely cutting and stripping insulation from insulated electrical conductors.

2. Description of the Prior Art

Industry utilizes two basic types of stripping blades for high production cutting and stripping of insulation from insulated electrical conductors, the "die" type and the "V" type. In the die type design, a pair of knife blades form complementary halves of a counterbored hole and a smaller through hole. The two blades are closed over the insulation of a specifically sized elongated insulated conductor to penetrate and cut the insulation. The die type design possesses the advantage of having the cutting edges closely conform to the configuration of the conductor around the full periphery thereof. Further, in the die type design the leading edges of the mating blades butt together at the end of the cutting stroke. The butting action provides excellent depth control for the cutting edges, thereby preventing nicking of the conductor.

Despite their advantages, die type blades have some serious drawbacks. One disadvantage is that a pair of die blades can be used with only one size of insulated conductor. A set of die blades thus lacks flexibility for processing larger or smaller conductor sizes. A second drawback of die type stripping blades is that they lack satisfactory sharp edges completely around the circumference of the hole formed by the mating blades. As a result, mating blades tend to squeeze rather than cut the insulation, and the insulation to be stripped must be torn from the parent insulation. A third disadvantage of die type blades is that they have limited ability to accommodate off-center insulated conductors transported between the open blades. In many applications, wire guides are required to help gather the insulated conductor into the working area between the blade cutting edges.

The V type stripping blade overcomes many of the disadvantages of the die type blades. For example, a single pair of V type blades can cut and strip several sizes of insulated conductors. Another advantage is that the V type blades have sharp knife edges that slice cleanly through the entire circumference of the insulation rather than merely squeezing it. V type blades possess the further advantage of being capable of gathering offset insulated conductors to the cutting edges. An exemplary design of V type blades is shown in U.S. Pat. No. 4,577,405, which describes a blade having a compound processing angle. The compound angle blade combines the flexibility of being able to handle a range of insulated conductor sizes with a sharp edge around the entire cutting edge. In essence, the compound angle blade combines the circumferential contact of the die type blade with the versatility and gathering ability of the V type blade.

Despite the benefits of the single angle and compound angle V type blades, they nevertheless occasionally present a certain problem. That problem pertains to misaligned blades. Should the blades be skewed because of mounting misalignment in the tool holder or for other reasons, the blades do not close to create a perfect circle around the insulated conductor. Consequently, the blades are likely to nick or cut off strands of the conductor.

A beneficial characteristic of die type stripping blades is that the blades can be manufactured to reduce misalignment by forming them with mating fingers and notches, such as is shown in U.S. Pat. No. 2,844,056. The design of the blades of the U.S. Pat. No. 2,844,056 is not completely satisfactory, however. That is because the guiding fingers and notches are located at some distance from the insulation cutting edges. Consequently, even though the finger and notch portions of the blades may be accurately aligned and guide each other, such accuracy is not inherently present at the cutting edges. Accordingly, merely changing V type blades to adopt the finger and notch of the die type blade does not solve the V blade misalignment problem.

Thus, a need exists for V type stripping blades that precisely cut and strip insulated electrical conductors on a production basis.

SUMMARY OF THE INVENTION

In accordance with the present invention, versatile V type stripping blades are provided that more accurately and consistently cut and strip insulated electrical conductors than was previously possible. This is accomplished by apparatus that includes rigid interlocking members that assure correct alignment of complimentary cutting edges.

The interlocking members may be formed with single angle, compound angle, or other forms of V type or other type cutting edges. The interlocked members are further manufactured so as to be relatively reciprocable. For that purpose, one member, referred to as the "long" blade, is fabricated with a generally T-shaped cross section. The second member, referred to as the "short" blade, has a generally U-shaped cross section. The width of the groove in the short blade is closely dimensioned to accept the leg of the long blade with virtually no clearance therebetween.

The long and short blades have insulation cutting edges that are symmetrical about the respective longitudinal center lines of the leg and groove. Thus, the interlocking leg and groove arrangement assures the creation of perfectly circular holes when the blades reciprocate to close the cutting edges over an insulated conductor.

Further in accordance with the present invention, mechanical components in the form of stops are optionally attachable to either interlocking blade. In one embodiment, the stop enables repeated formation of a cutting circle of the exact size required for the insulation to be cut. In an alternate embodiment, the stop provides precise locations for the insulated conductor within the cutting edges. The alternative embodiment gives good cutting edge depth control to prevent nicking the conductor, while maintaining the minimum conductor strip length achievable with conventional cutting and stripping blades. The stops are easily removed from or adjusted on the cutting blades when desired to enable the blades to be used on a range of conductor sizes.

Other objects and advantages of the invention will become apparent to those skilled in the art from the disclosure.

BRIEF DESCRIPTION OF THE DRAWINGS

FIG. 1 is a simplified top view of a typical tooling set-up using the stripping blades of the present invention;

FIG. 2 is a partial cross sectional view taken along line 2–2 of FIG. 1;

FIG. 3 is an enlarged cross sectional view taken along lines 3–3 of FIG. 1;

FIG. 4a is a perspective view of one of the cutting blades of the present invention;

FIG. 4b is a perspective view of a second cutting blade according to the present invention;

FIG. 4c is a perspective view of the back side of the blade of FIG. 4a;

FIG. 5a is a front view of the short blade of the present invention;

FIG. 5b is a back view of the short blade of the present invention;

FIG. 6a is a front view of the long blade of the present invention;

FIG. 6b is a back view of the long blade of the present invention;

FIG. 7 is a top view of the cutting blades in combination with a blade stop according to the present invention;

FIG. 8 is a view taken along lines 8—8 of FIG. 7;

FIG. 9 is an enlarged cross sectional view taken along lines 9—9 of FIG. 7;

FIG. 10 is a perspective view of the blade stop of the present invention;

FIG. 11 is a top view of the cutting blades in combination with an insulation stop according to the present invention;

FIG. 12 is a view taken along lines 12—12 of FIG. 11;

FIG. 13 is an enlarged cross sectional view taken along lines 13—13 of FIG. 11;

FIG. 14 is a perspective view of the insulation stop of the present invention.

DETAILED DESCRIPTION OF THE INVENTION

Figure 4C:
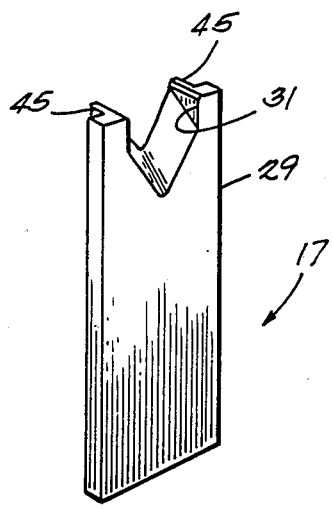

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIG. 1, the cutting station 1 of an insulated electrical conductor cutting and stripping machine 3 is illustrated that includes the present invention. The pertinent portion of the cutting and stripping machine 3 includes a pair of tool holders 5 and 6 that reciprocate relative to each other by known means in the directions of arrow 7. Mounted to the tool holders 5 and 6 are three pairs of mating blades. The outer pairs 9 comprise the stripping blades of this invention. The center pair of blades 10 are conventional "cut-off" blades. As the tool holders 5 and 6 close toward each other, the opposed cut-off blades 10 bypass each other, thereby cutting a continuous length of insulated electrical conductor 11 into two pieces. The outer stripping blade pairs 9 penetrate only through the insulation 71, thereby defining the insulation strip length. The pairs of blades 9 and 10 may be clamped in the tool holders by means of spacers 13 together with set screws 15, as is known in the art.

Figure 4D:
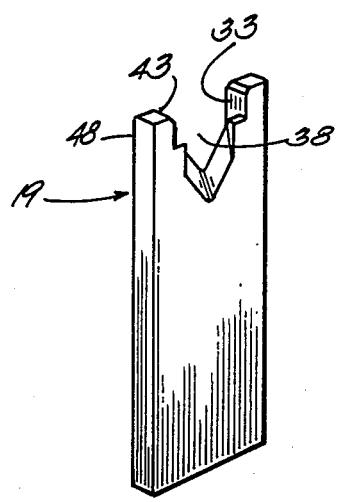
FIG. 4d is a perspective view of the back side of the blade of FIG. 4b.

In accordance with the present invention, each pair of cutting blades 9 is comprised of two interlocking blades 17 and 19. Referring especially to FIGS. 3, 4a and 4c, the blade 17 has a generally T-shaped cross section and is commonly referred to as the "long" blade. Referring to FIGS. 3, 4b and 4d, the blade 19 has a generally U-shaped cross section and is commonly referred to as a "short" blade.

The short blade 19 defines a groove bounded by a groove bottom surface 23 and a pair of opposed groove side surfaces 25. The long blade 17 defines a leg 21 that is bounded by opposed leg side surfaces 27 and a leg face 26. The leg 26 is integral with a base or cross portion 28. The base or cross portion 28 is bounded on three sides by outer face 46 and opposed side surfaces 29. As best shown in FIGS. 1–3, the long and short blades interlock with each other by means of the leg 21 of the long blade and the groove in the short blade. Thus, as the tool holders and 5 and 6 reciprocate in the directions of arrow 7, the long blade leg slides within the short blade groove.

To cut and strip insulation 71 from the insulated electrical conductor 11, the blades 17 and 19 are formed with respective cutting edges 31 and 33, FIGS. 4–6. The cutting edges 31 and 33 are essentially identical and may be of any desired form. A single angle cutting edge is depicted, but the compound angle described in U.S. Pat. No. 4,577,405, as well as other configurations, including multiple conductor forms, may also be employed. Regardless of the configuration, the long blade cutting edge 31 is accurately symmetrical about longitudinal center line 35, and short blade cutting edge 33 is accurately symmetrical about longitudinal center line 37. As best shown in FIG. 4a, the long blade cutting edge 31 is partially bounded by the leg face 26. As best shown in FIG. 4b, the short blade cutting edge 33 is partially bounded by the groove bottom surface 23. It is preferred that the mouth 38 of the short blade cutting edge 33 is recessed a short distance into the short blade from the blade leading edge 41.

Turning back to FIG. 3, the distance between the short blade groove side surfaces 25 is very accurately dimensioned in relation to the side surfaces 27 of the long blade 17. Consequently, the blades 17 and 19 reciprocate relative to each other with essentially no side play. There preferably is a very small amount of clearance between the short blade bottom surface 23 and the leg face 26. The locations of the groove side surfaces 25 are also very accurately located such that they are equidistant laterally from the cutting edge longitudinal center line 37. In a similar manner, the side surfaces 27 of the long blade leg 21 are accurately equidistant laterally from the cutting edge longitudinal center line 35. As a result, when the two blades are in interlocking engagement with each other, their respective center lines coincide, and the cutting edges 31 and 33 of the closed blades cooperate to create a perfect cutting circle 39 (FIG. 2) for slicing the insulation 71 of the insulated electrical conductor 11.

To facilitate interlocking engagement of the two blades 17 and 19 despite any misalignment in their mountings in the tool holders 5 and 6 and the tight tolerances between the long blade leg 21 and the short blade groove, the corners of the short blade leading edge 41 and the groove side surfaces 25 are formed with chamfers 43. See FIGS. 2 and 5. In addition, the corners of the long blade leg side surfaces 27 and the leg face 26 are chamfered, as indicated by reference numeral 45 in FIGS. 3, 4a, and 6a. Similarly, the corners of the short blade groove side surfaces 25 and top face 48 are chamfered at 47, FIGS. 2, 3, 4b, and 5a.

It is a feature of the present invention that the stiffness of the interlocking pair of blades 9 is greatly increased relative to prior blade pairs without increasing the overall thickness of a blade pair. This beneficial result is obtained because the total thickness of each blade 17 and 19 is approximately 0.13 inches. Specifically, the thickness of the long blade 17 between the leg face 26 and the outer face 46 is approximately 0.13 inches, and the thickness of the short blade 19 between the outside face 51 and the top face 48 is approximately 0.13 inches. In contrast, in conventional cutting blade pairs, only the long blade is 0.13 inches thick; the short blade is only approximately 0.06 inches thick. The overall thickness is approximately 0.18 inches. The T-shaped long blade and U-shaped short blade of the present invention inherently provides stiffness to both blades in proportion to their 0.13 inch thicknesses without increasing the overall thickness of the pair. At the same time, the thickness of the short blade wall 49 between the outside face 51 and the groove bottom surface 23 is maintained at approximately 0.06 inches, which is the overall thickness of conventional short blades. Consequently, the total thickness of approximately 0.18 inches of conventional blades is maintained without sacrificing the minimum achievable conductor strip length of prior blades.

Further in accordance with the present invention, means is provided for creating precision cutting hole diameters for precisely controlling blade cutting edge penetration into the electrical conductor insulation 71. Referring to FIGS. 7-10, a pair of cutting blades 9' is shown installed in the tool holders 5' and 6' of a cutting and stripping machine 3'. The blades 9' may consist of long and short blades 17 and 19, respectively, as described previously. To precisely create a cutting hole 53, a blade stop 55 is employed in conjunction with the blades 17 and 19. In FIGS. 7-10, the blade stop 55 is configured with a U-shaped cross section having approximately the same lateral dimensions as the short blade 19. That is, the blade stop has a top face 56, outside face 58, and a groove defined by a groove bottom surface 60 and opposed groove side surfaces 62. The blade stop interlocks with the long blade 17 and is inserted in the tool holder 6' together with the long blade. The exposed end surface 57 is set such that the leading edge 41 of the short blade abuts the blade stop at the end of the cutting stroke.

The presence of the blade stop 55 is important in two situations. The first occurs when the stripping and cutting machine 3' is worn such that the tool holders 5' and 6' do not trace precise paths during the cutting cycles. In that situation, the holes 53 vary in size from cycle to cycle. The use of the blade stop prevents overtravel of the blades 17 and 19, and therefore a minimum cutting hole diameter is maintained.

The second situation in which the blade stop 55 is desirable occurs when the user knows the optimum diameter of the hole 53 for stripping a particular insulated electrical conductor 11. By positively stopping the blades 9' at the predetermined hole size, the possibility of the machine operator inadvertently varying the hole size is eliminated.

If desired, the blade stop 55 may be configured to have the T-shaped cross section of the long blade 17. In that case, the blade stop would fit over the short blade 19, and it would be inserted along with the short blade in the tool holder 5'.

Turning to FIGS. 11-14, the blades 17 and 19 of the present invention are shown in conjunction with an insulation stop 59. The insulation stop 59 is illustrated as having a T-shaped cross section substantially identical to that of the long blade 17. The insulation stop leg 61 fits within the groove of the short blade 19, and it is mounted in the tool holder 6' together with the short blade. The insulation stop has a longitudinally extending protrusion 63 terminating in a stop surface 65 that is accurately located a predetermined distance from the corresponding end surface 67. The insulation stop is set within the tool holder 6' such that the leading edge 69 of the long blade abuts the insulation stop end surface 67 at the end of the cutting stroke. The protrusion stop surface 65 serves as a locating means for the insulated electrical conductor 11 when the blades close thereover. The protrusion stop surface 65 therefore defines a penetration depth D of the sharp blade cutting edges into the insulation 71. Control of the penetration depth D is highly desirable to assure that the cutting edges do not nick or cut strands of the conductor 73.

It will be appreciated that the insulation stop may be manufactured with a U-shaped cross section essentially identical to that of the short blade 19 rather than the T-shaped cross section as illustrated. In that case, the insulation stop would fit over the long blade 17 and be installed in the toolholder 5'.

The blade stop 55 and insulation stop 59 are independent components of the present invention. They may be added or removed from the blades 9' as needed. In that way, a modular concept is achieved, and great flexibility in using the present invention is available.

Thus, it is apparent that there has been provided, in accordance with the invention, an interlocking blade pair for stripping insulated electrical conductors that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A blade having a generally T-shaped transverse cross section defined by a leg portion having opposed leg side surfaces and a leg face, and further defined by a base/cross portion having an outer face, said blade having opposed longitudinal ends, the outer and leg faces extending continuously in respective flat planes between the opposed longitudinal ends, one of the longitudinal ends having an opening extending between the outer face and the leg face, inclusive, said opening being defined by a V-shaped cutting edge lying in the plane of the leg face and having first and second edges that converge toward a longitudinal center line of the blade to terminate in a curved cutting edge at said center line, and further defined by a beveled surface extending from said V-shaped cutting edge to said outer face.

2. The blade of claim 1 wherein the:
  a. the leg side surfaces are accurately symmetrical about a first longitudinal center line; and
  b. the curved cutting edge is accurately symmetrical about the first longitudinal center line.

3. A blade having a top face and an outside face parallel thereto, said blade having a groove defined by a groove bottom surface and opposed groove side surfaces, said groove bottom surface being substantially parallel to said outside face, the blade having first and second longitudinal ends, the first longitudinal end having an opening extending between the groove bottom surface and the outside face, inclusive, said opening being defined by a V-shaped cutting edge lying in the plane of the groove bottom surface and having first and second edges that converge toward a longitudinal center line of the blade to terminate in a curved cutting edge at said center line, and further defined by a beveled surface extending from said V-shaped cutting edge to said outside face.

4. The blade of claim 3 wherein:
   a. the opposed groove side surfaces are accurately symmetrical about a first longitudinal center line; and
   b. the curved cutting edge is accurately symmetrical about the first longitudinal center line.

5. Apparatus for cutting and stripping insulation from insulated electrical conductors comprising:
   a. a first stripping blade having a generally T-shaped transverse cross section defined by a leg portion having opposed leg side surfaces and a leg face, and further defined by a base/cross portion having an outer face, said blade having opposed longitudinal ends, the first longitudinal end having an opening extending between the outer face and the leg face, inclusive, said opening being defined by a V-shaped cutting edge lying in the plane of the leg face and having first and second edges that converge toward a longitudinal center line of the blade to terminate in a curved cutting edge at said center line, and further defined by a beveled surface extending from said V-shaped cutting edge to said outer face; and
   b. a second stripping blade having a top face and an outside face parallel thereto, said blade having a groove defined by a groove bottom surface and opposed groove side surfaces, said groove bottom surface being substantially parallel to said outside face, the blade having first and second longitudinal ends, the first longitudinal end having an opening extending between the groove bottom surface and the outside face, inclusive, said opening being defined by a V-shaped cutting edge lying in the plane of the groove bottom surface and having first and second edges that converge toward a longitudinal center line of the blade to terminate in a curved cutting edge at said center line, and further defined by a beveled surface extending from said V-shaped cutting edge to said outside face, the second stripping blade curved cutting edge being substantially identical to the curved cutting edge of the first stripping blade, the second stripping blade groove being dimensioned to receive the first stripping blade leg with minimum transverse play therebetween to transversely interlock the first and second stripping blades and to permit relative longitudinal reciprocation therebetween, the curved cutting edges of the first and second stripping blades cooperating to form complementary halves of a cutting circle for cutting the insulation of the insulated electrical conductor.

6. The apparatus of claim 5 wherein:
   a. the first stripping blade leg is symmetrical about a first longitudinal center line and the first stripping blade curved cutting edge is symmetrical about the first longitudinal center line;
   b. the second stripping blade groove is symmetrical about a second longitudinal center line and the second stripping blade curved cutting edge is symmetrical about the second longitudinal center line; and
   c. the first and second longitudinal center lines coincide when the first stripping blade leg is interlockingly received within the second stripping blade groove.

7. The apparatus of claim 6 wherein:
   a. the thickness of the first stripping blade between the leg face and the outer face is approximately 0.12 inches;
   b. the thickness of the second stripping blade between the top face and outside face is approximately 0.12 inches; and
   c. the total thickness of the interlocked first and second blades is approximately 0.18 inches, so that the stiffnesses of the interlocked first and second blades are proportional to the respective thicknesses of 0.12 inches while maintaining a total blade pair thickness of approximately 0.18 inches.

8. The apparatus of claim 7, wherein the thickness of the second blade between the groove bottom surface and the outside face is approximately 0.06 inches to thereby enable a minimum insulation strip length of approximately 0.06 inches to be achieved while maintaining a second blade stiffness proportional to a thickness of approximately 0.12 inches.

9. The apparatus of claim 6 wherein the mouth of the converging opening in the first longitudinal end of the second stripping blade is recessed from the first longitudinal end thereof.

10. The apparatus of claim 9 wherein the corners between the second stripping blade first longitudinal end and the respective groove side surfaces are chamfered to thereby facilitate interlocking engagement of the first and second stripping blades.

11. The apparatus of claim 10 wherein:
   a. the corners between the leg face and the respective opposed leg side surfaces of the first stripping blade are formed with chamfers; and
   b. the corners between the groove side surfaces and the top face of the second stripping blade are formed with respective chambers,
   so that interlocking engagement of the first and second cutting blades is further facilitated.

12. In a machine for processing insulated electrical conductors and having first and second tool holders and means for relatively reciprocating the tool holders in continuous cycles, apparatus for cutting and stripping the insulation from the insulated electrical conductors comprising:
   a. a first stripping blade clamped to the machine first tool holder, the first stripping blade having a generally T-shaped transverse cross section defined by a leg portion having opposed leg surfaces and a leg face, and further defined by a base/cross portion having an outer face, said blade having opposed longitudinal ends, the first longitudinal end being clamped in the first tool holder, the second longitudinal end having an opening extending between the outer face and the leg face, inclusive, said opening being defined by a V-shaped cutting edge lying in the plane of the leg face and having first and second edges that converge toward a longitudinal center line of the blade to terminate in a curved cutting edge at said center line and further defined by a beveled surface extending from said V-shaped cutting edge to said outer face; and b. a second stripping blade clamped to the second tool holder, the second stripping blade having a top face and an outside face parallel thereto, said blade having a groove defined by a groove bottom surface and opposed groove side surfaces, said groove bottom surface being substantially parallel to said outside face, the second stripping blade having first and second longitudinal ends, the first longitudinal end being clamped to the second tool holder, the second longitudinal end having an opening extending between the groove bottom surface and the outside face, inclusive, said opening being defined by a V-shaped cutting edge lying in the plane of the groove bottom surface and having first and second edges that converge toward a longitudinal center line of the second stripping blade to terminate in a curved cutting edge at said center line, and further defined by a beveled surface extending from said V-shaped cutting edge to said outside face, the curved cutting edge of the second stripping blade being substantially identical to the cutting edge of the first stripping blade, the second stripping blade groove being dimensioned to receive the first stripping blade leg with minimum transverse play therebetween to transversely interlock the first and second stripping blades and to permit relative reciprocation therebetween as the first and second tool holders reciprocate, the curved cutting edges of the first and second stripping blades cooperating to form complementary halves of a cutting circle for cutting the insulation from the insulated electrical conductor.

13. The machine of claim 12 wherein:
a. the first stripping blade leg is symmetrical about a first longitudinal center line and the first stripping blade curved cutting edge is symmetrical about the first longitudinal center line;
b. the second stripping blade groove side surfaces are symmetrical about a second longitudinal center line and the second stripping blade curved cutting edge is symmetrical about the second longitudinal center line; and
c. the first and second longitudinal center lines are coincident when the first stripping blade leg is transversely interlocked with the second cutting blade groove.

14. The machine of claim 13 wherein the mouth of the converging opening in the second stripping blade is recessed from second longitudinal end thereof.

15. The machine of claim 14 wherein the corners between the second stripping blade second longitudinal end and the respective groove side surfaces are chamfered to thereby facilitate interlocking engagement of the first and second stripping blades.

16. The machine of claim 15 wherein:
a. the corners between the leg face and the respective opposed leg side surfaces of the first stripping blade are formed with respective chamfers; and
b. the corners between the groove side surfaces and the top face of the second stripping blade are formed with respective chamfers, so that interlocking engagement of the first and second stripping blades is further facilitated.

17. The machine of claim 16 further comprising first stop means clamped to a selected machine tool holder and interlocked with the corresponding stripping blade for controlling the relative positions of the first and second stripping blades during the process cycles.

18. The machine of claim 17 wherein the first stop means comprises a blade stop formed with a generally U-shaped cross section and having a groove defined by a groove bottom surface and opposed groove side surfaces and including a top face and an outside face and first and second longitudinal ends, the blade stop first longitudinal end being clamped to the machine first tool holder and interlocked with the first stripping blade and being positioned such that the second longitudinal end of the second stripping blade abuts the blade stop second longitudinal end at the termination of the machine closing cycle to thereby enable the first and second stripping blades to create precision cutting holes for penetrating the electrical conductor insulation.

19. The machine of claim 17 wherein the first stop means comprises a blade stop formed with a generally T-shaped cross section having a leg with opposed leg side surfaces and including opposed outer and leg faces and first and second longitudinal ends, the blade stop first longitudinal end being clamped to the machine second tool holder and interlocking with the second stripping blade and being positioned such that the second longitudinal end of the first stripping blade abuts the blade stop second longitudinal end at the termination of the closing cycle to thereby enable the first and second cutting blades to create precision cutting holes for penetrating the electrical conductor insulation.

20. The machine of claim 16 further comprising second stop means clamped to a selected tool holder and interlocking with the corresponding stripping blade for locating the insulated electrical conductor relative to the radius cutting edges of the first and second stripping blades during the processing cycles.

21. The machine of claim 20 wherein the second stop means comprises an insulation stop formed with a generally T-shaped cross section and having a leg with opposed leg side surfaces and including opposed outer and leg faces and first and second opposed longitudinal ends, the first longitudinal end being fabricated with a longitudinally extending protrusion that terminates in a stop surface located at a predetermined distance from the first longitudinal end, the second longitudinal edge being clamped to the machine second tool holder, the insulation stop being interlocked with the second stripping blade and being positioned thereon such that the protrusion stop surface accurately locates the insulated electrical conductor relative to the second stripping blade cutting edge and the second longitudinal end of the first cutting blade abuts the insulation stop first longitudinal end at the termination of the closing cycle to thereby precisely control the depth of the insulation cut by the stripping blade cutting edges.

22. The machine of claim 20 wherein the second stop means comprises an insulation stop formed with a generally U-shaped transverse cross section having a groove defined by a groove bottom surface and opposed groove side surfaces and including a top face and an outside face parallel thereto, the insulation stop having first and second opposed longitudinal ends, the first longitudinal end being formed with a longitudinally extending protrusion that terminates in a stop surface located at a predetermined distance from the first longitudinal end, the second longitudinal end being clamped to the machine first tool holder, the insulation stop being transversely interlocked with the first stripping blade and being positioned thereon such that the protrusion stop surface precisely locates the insulated electrical conductor relative to the first stripping blade cutting edge and the second longitudinal end of the second stripping blade abuts the insulation stop first longitudinal end at the termination of the machine closing cycle to thereby precisely control the depth of the insulation cut by the stripping blade cutting edges.

* * * * *

UNITED STATES PATENT AND TRADEMARK OFFICE
CERTIFICATE OF CORRECTION

PATENT NO.   : 4,852,433
DATED        : August 1, 1989
INVENTOR(S)  : John D. Butler It is certified that error appears in the above—identified patent and that said Letters Patent is hereby corrected as shown below:

Column 8, Line 49:   Delete "chambers" and substitute therefor ---chamfers---

Signed and Sealed this

Fourth Day of September, 1990

Attest:

HARRY F. MANBECK, JR.

*Attesting Officer*          *Commissioner of Patents and Trademarks*